United States Patent
Murray

(10) Patent No.: US 7,519,177 B2
(45) Date of Patent: *Apr. 14, 2009

(54) METHOD AND SYSTEM FOR PROCESSING A DATA SET

(75) Inventor: Douglas G. Murray, Johnson City, NY (US)

(73) Assignee: International Business Machines Corporation, Armonk, NY (US)

(*) Notice: Subject to any disclaimer, the term of this patent is extended or adjusted under 35 U.S.C. 154(b) by 356 days.

This patent is subject to a terminal disclaimer.

(21) Appl. No.: 11/299,877

(22) Filed: Dec. 12, 2005

(65) Prior Publication Data

US 2006/0088158 A1 Apr. 27, 2006

Related U.S. Application Data

(62) Division of application No. 09/741,603, filed on Dec. 19, 2000, now Pat. No. 7,006,629.

(51) Int. Cl.
*H04L 9/00* (2006.01)
*H04K 1/00* (2006.01)

(52) U.S. Cl. ........................................ 380/43; 380/277

(58) Field of Classification Search ........................ None
See application file for complete search history.

(56) References Cited

U.S. PATENT DOCUMENTS

| 4,418,425 | A | 11/1983 | Fennel, Jr. et al. |
|---|---|---|---|
| 4,558,176 | A | 12/1985 | Arnold et al. |
| 4,776,011 | A | 10/1988 | Busby |
| 4,984,270 | A | 1/1991 | LaBounty |
| 5,003,596 | A | 3/1991 | Wood |
| 5,124,117 | A | 6/1992 | Tatebayashi et al. |
| 5,377,270 | A | 12/1994 | Koopman, Jr. et al. |
| 5,512,977 | A | 4/1996 | Imai |
| 5,764,768 | A | 6/1998 | Spelman et al. |
| 5,768,390 | A | 6/1998 | Coppersmith et al. |
| 6,141,421 | A | 10/2000 | Takaragi et al. |
| 6,269,164 | B1 | 7/2001 | Pires |
| 6,490,353 | B1 * | 12/2002 | Tan ............................. 380/37 |
| 6,823,069 | B1 * | 11/2004 | Kitajima et al. ............... 380/44 |
| 6,898,286 | B2 * | 5/2005 | Murray ....................... 380/202 |
| 7,190,791 | B2 * | 3/2007 | Boren et al. ................... 380/45 |
| 2001/0012362 | A1 * | 8/2001 | Marzahn ...................... 380/42 |
| 2005/0152538 | A1 * | 7/2005 | Stedron et al. ................ 380/28 |
| 2006/0067533 | A1 * | 3/2006 | Yanovsky .................... 380/278 |
| 2006/0177061 | A1 * | 8/2006 | Orsini et al. ................. 380/268 |
| 2006/0215839 | A1 * | 9/2006 | Augenstein et al. ......... 380/277 |

* cited by examiner

*Primary Examiner*—Christopher A Revak
(74) *Attorney, Agent, or Firm*—Carl Lanuti; Hoffman Warnick LLC

(57) ABSTRACT

A method and system for processing a data set. More particularly, the present invention provides a method and system for encrypting or decrypting a data set so that the data set remains entirely in the ASCII printable range. The method and system of the present invention allow a key of any length to be selected. Once selected, the key is formatted to the length of the data set and then masked so that predetermined bits are set to zero. An exclusively-OR result is then formed with the data set and the masked key to yield an encrypted data set.

28 Claims, 5 Drawing Sheets

METHOD AND SYSTEM FOR PROCESSING A DATA SET

This application is a divisional of application Ser. No. 09/741,603, filed Dec. 19, 2000, now U.S. Pat. No. 7,006,629 currently pending.

BACKGROUND OF THE INVENTION

1. Technical Field

The present invention generally relates to a method and system for processing a data set. More particularly, the present invention relates to a method and system for encrypting or decrypting a data set so that the data set remains in the ASCII printable range.

2. Background Art

As the use of computer software becomes more prolific, the need to control its usage grows. The use of a software product is typically controlled by a license agreement between the software producer and the end-user. Traditionally, license agreements are included with the purchased product as "shrink-wrap" licenses. However, such licenses do little to prevent software piracy. Accordingly, software producers are beginning implement license agreements by exchanging license data with the end-user separately from the sale of the product.

When exchanging license data separately from the product, maintaining the integrity of the data is essential. Specifically, the license data may include a list of authorized users, which when matched with an end-user's computer system, permits the installation or execution of the product. Thus, it is vital to ensure that the license data cannot be tampered with or manipulated in such a way that would allow for the unauthorized installation/use of the software product. To prevent the license data from being read and understood, it can be encrypted prior to its use.

Encryption is well known in the art and generally is accomplished by performing an operation on a data set with a "key," which can later be used to decrypt the data set. Heretofore, various attempts have been made at encrypting and decrypting data. However, such previous attempts fail to provide a standard format for the data set. Accordingly, as the data set is translated between computer systems having different operating systems and protocols, it can become corrupted. Such translations are especially problematic when the data set is translated outside of the ASCII printable range where many operating systems assign different values to data. In addition, previous attempts at encrypting a data set required the selection of a key of a pre-determined length. This reduces the effectiveness of the encryption in that the key length is often predictable by third parties.

In view of the above, there exists a need for a method and system for encrypting a data set so that the data set will remain in the ASCII printable range, thereby ensuring that the data set will remain valid for all operating systems, applications and protocols. Moreover, there exists a need for a method and system that does not require a key of a specific length for encryption of the data set.

SUMMARY OF THE INVENTION

The present invention overcomes the problems associated with existing systems by providing a method and system for processing data. Specifically, the present invention provides a method and system for encrypting or decrypting a data set such that before and after encryption, the data set remains in the ASCII printable range. Moreover, the present invention provides a method and system for encrypting or decrypting a data set using a key of any length.

According to a first aspect of the present invention, a method for processing a data set is provided. The method comprises the steps of: (1) providing a data set having a first length; (2) formatting a key to the first length; (3) setting pre-determined bits of the formatted key to zero to yield a masked key; and (4) forming an exclusive-OR result of the data set with the masked key to yield an encrypted data set.

According to a second aspect of the present invention, a method for processing a data set is provided. The method comprises the steps of: (1) providing a data set having a first length that includes at least four low order bits; (2) providing a key having a second length; (3) formatting the key to equal the first length; and (4) performing a logical operation on the four low order bits of the data set with a corresponding four low order bits of the formatted key.

According to a third aspect of the present invention, a system for processing a data set having a first length is provided. The system comprises: (1) a system for formatting a key to the first length; (2) a system for setting pre-determined bits of the key to zero to yield a masked key; and (3) a system for forming an exclusive-OR result of the data set with the masked key to yield an encrypted data set.

According to a fourth aspect of the present invention, a system for processing a data set is provided. The system comprises: (1) a data set having a first length that includes at least four low order bits; (2) a key having a second length; (3) a system for formatting the key to equal the first length; and (4) a system for forming an exclusive-OR result of the four low order bits of the data set with a corresponding four low order bits of the formatted key to yield an encrypted data set.

According to a fifth aspect of the present invention, a program product stored on a recordable media for processing a data set having a first length is provided. When executed, the program product comprises: (1) a system for formatting a key to the first length; (2) a system for setting pre-determined bits of the key to zero to yield a masked key; and (3) a system for forming an exclusive-OR result of the data set with the masked key to yield an encrypted data set.

It is therefore an advantage of the present invention to provide a method and system for processing data. It is a further advantage of the present invention to provide a method and system for encrypting or decrypting a data set so that the data set remains in the ASCII printable range. It is a further advantage of the present invention to provide a method and system for encrypting or decrypting data with a key of any length.

BRIEF DESCRIPTION OF THE DRAWING

These and other features and advantages of this invention will be more readily understood from the following detailed description of the various aspects of the invention taken in conjunction with the accompanying drawings in which.

Figure 1:
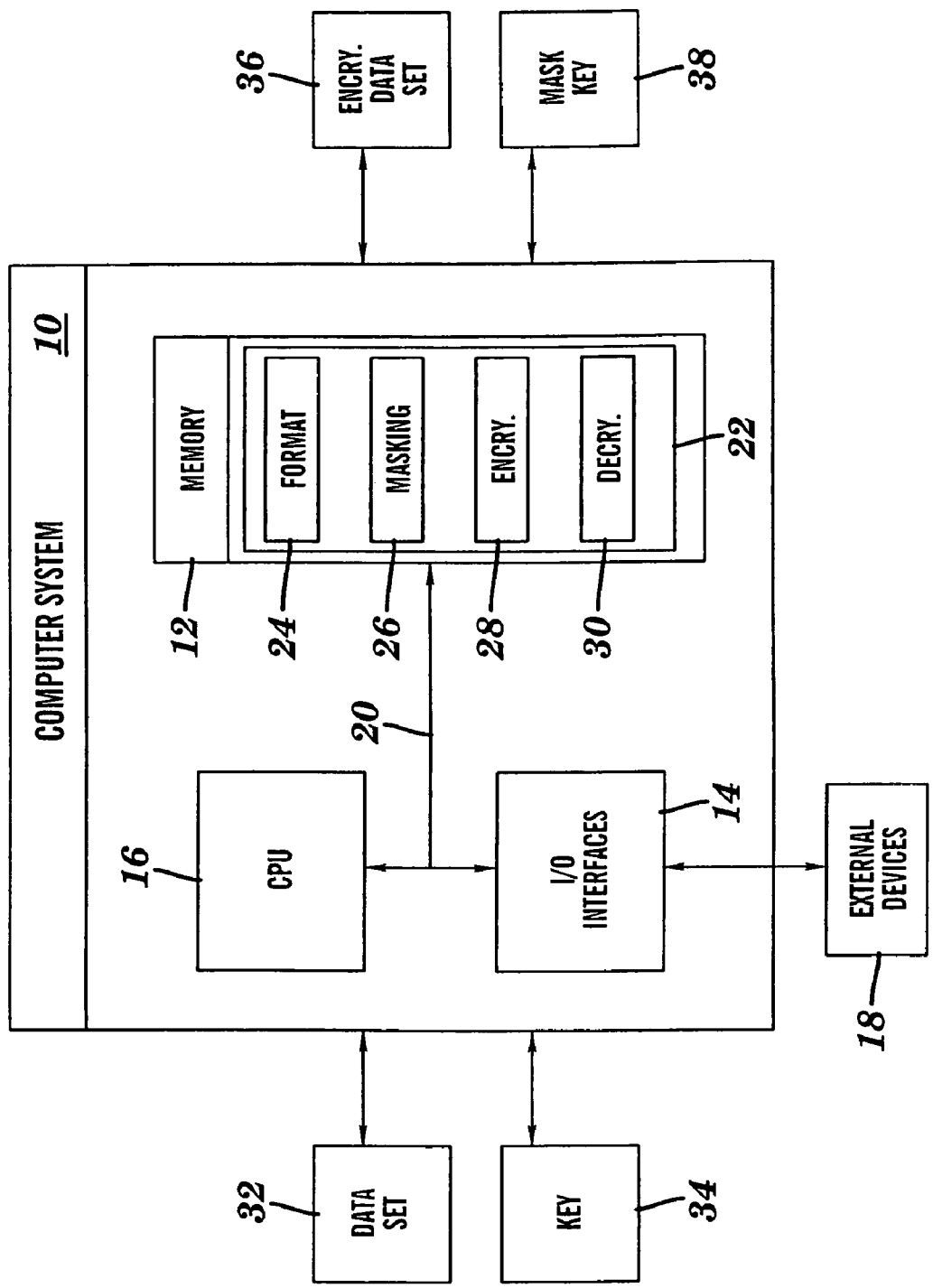
FIG. 1 depicts a block diagram of a computer system having a processing system in accordance with the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE INVENTION

Generally stated, the present invention provides a method and system for processing a data set. Specifically, the present invention provides a method and system for encrypting or decrypting a data set so that the data set remains entirely within the ASCII printable range. This prevents translation problems as the data set is transmitted over a network, such as the Internet. In addition, the present invention provides a method and system for encrypting or decrypting a data set with a key that may be any length (i.e., have any quantity of characters).

Referring now to FIG. 1, a computer system 10 depicting the processing system 22 of the present invention is shown. The computer system 10 generally comprises memory 12, input/output interfaces 14, a central processing unit (CPU) 16, external devices/resources 18, and bus 20. Memory 12 may comprise any known type of data storage media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand held device, keyboard, mouse, voice recognition system, speech output system, printer, facsimile, pager, personal digital assistant, etc. Bus 20 provides a communication link between each of the components in the server system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is processing system 22 (shown in FIG. 1 as a software product). Processing system 22 will be described in more detail below but generally comprises a method and system for processing a data set, using a key of any length, so that the data set remains entirely within the ASCII printable range. Specifically, processing system 22 includes: formatting system 24, masking system 26, encryption system 28, and decryption system 30. It should be appreciated, however, that although a specific embodiment of the processing system 22 is depicted, other variations may exist. For example, encryption and decryption systems 28 and 30 may be a single system.

It is understood that the present invention can be realized in hardware, software, or a combination of hardware and software. The computer system 10 according to the present invention can be realized in a centralized fashion in a single computerized workstation, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, controls the computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

As indicated above, data set 32 will be encrypted using the processing system 22. The concept of encryption is well known in the art and is the process whereby a logical operation is performed on the data set 32 with a key 34 that causes the values of the data to change. Under the present invention, however, data set 32 remains within the universally recognized ASCII printable range. The extended ASCII range generally includes 256 characters, which when represented in hexadecimal ranges from 00 to FF. The ASCII printable range is the first 128 characters or from 00 to 7F. The processing system 22 of the present invention encrypts the data set 32 so that it remains in this ASCII printable range. As indicated above, the printable range is universally recognized and typically results little or no translation problems. Below is listed a conversion table of hexadecimal values 0 through F to bytes of binary data 0000 through 1111

```
0 - 0000
1 - 0001
2 - 0010
3 - 0011
4 - 0100
5 - 0101
6 - 0110
7 - 0111
8 - 1000
9 - 1001
A - 1010
B - 1011
C - 1100
D - 1101
E - 1110
F - 1111
```

Each letter or character in the ASCII data set is represented by two bytes of data (i.e., a code). For example, the ASCII representation of the letter "R" in hexadecimal is 5-2. Using the table above, the binary representation of "R" would be 0101 0010 with 0101 being high order bits and 0010 being low order bits. As noted, the ASCII printable range is 00 to 7F (binary 0000 0000 to 0111 1111).

As discussed, the ASCII printable range is universally recognized and produces little or no translation problems. Specifically, virtually all systems assign the same ASCII codes for the same characters within the printable range. For example, Windows® and the IBM P.C.® both attribute the ASCII codes 5-2 to the letter "R." However, once data extends beyond the printable range, it not longer remains universal. For example, codes above hexadecimal 7F may be assigned characters or may not exist depending on the particular system. Thus, upon transfer between the systems, the data set may be materially altered or corrupted.

Figure 2:
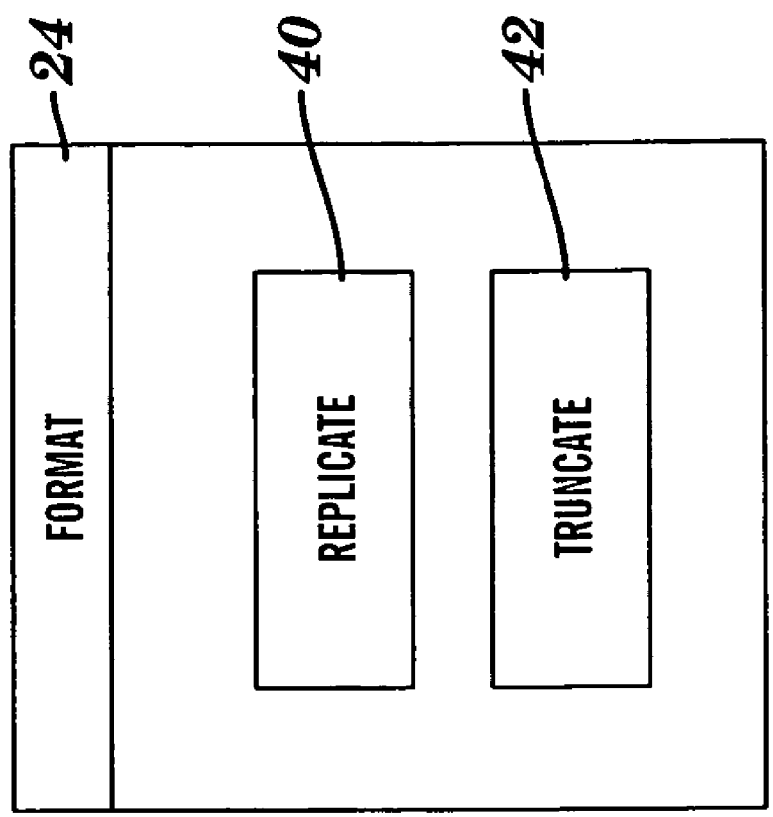
FIG. 2 depicts an exemplary embodiment of a formatting system of the processing system of FIG. 1.

Under the present invention, the key 34 used to encrypt the data set 32 can be any length or number of characters. Under previous embodiments, the key had to be a specific length, which was usually dependent on the length of the data set. Once selected, the formatting system 24 will replicate and/or truncate the key 32 to match the length of the data set 32. Specifically, if the data set was "R" or 0101 0010 and the key 34 was binary 10, the replication sub-system 40 (FIG. 2) of the formatting system 24 would replicate the key 34 to the length of the data set 32. Thus, the formatted key would be 0101 0101, assuming replication occurred beginning with the four low order bits. Similarly, if the key was 0101 0101 0101, the truncation sub-system 42 (FIG. 2) would truncate the key to 0101 0101. A key may also be both replicated and truncated to match the length of the data set. For example, if the key was 101, the key could be replicated to 1011 0101 0101 and then truncated to 1011 0101.

The capability to select a key 34 having any length increases the number of possibilities the key 34 may have and accordingly, reduces the likelihood of unauthorized decryption of an encrypted data set 36. Once the key 32 has been formatted to the length of the data set 32, the masking system 26 will set predetermined bits of the key to zero. Specifically, if the formatted key is 0101 0101, four of the bits will be set to zero to yield a masked key. Preferably, the four low order bits are masked (preserved) while the four high order bits are set to zero to yield a masked key of 0000 0101. It should be appreciated, however, that in an alternative embodiment the low order bits could be set to zero while the high order bits are masked. As will be described in further detail below, the four high order bits are preferably set to zero by forming an AND logical result of the formatted key with 0F or 0000 1111.

Once the masked key 30 has been formed, the encryption system 28 will encrypt the data set 32 by forming an exclusive-OR result of the data set 32 with the masked key. Thus, if the data set 32 was the letter "R" and the masked key was 0000 0101, binary 0101 0010 would be exclusively-ORed with 0000 0101 to produce the encrypted data set 36 of 0101 0111. As can be seen, by forming an exclusive-OR result of the data set 32 with the masked key, only the lower four bits of the data set are altered. It should be appreciated that according to this invention, a data set can be encrypted by performing any logical operation on only the lower four bits of the data set (e.g., with the four lower bits of the formatted key).

The encrypted data set 36 can be decrypted by the decryption system 30. This requires forming an inverse exclusive-OR result of the encrypted data set 36 with the masked key, or the lower four bits of the encrypted data set 36 with the lower four bits of the formatted key.

Figure 3:
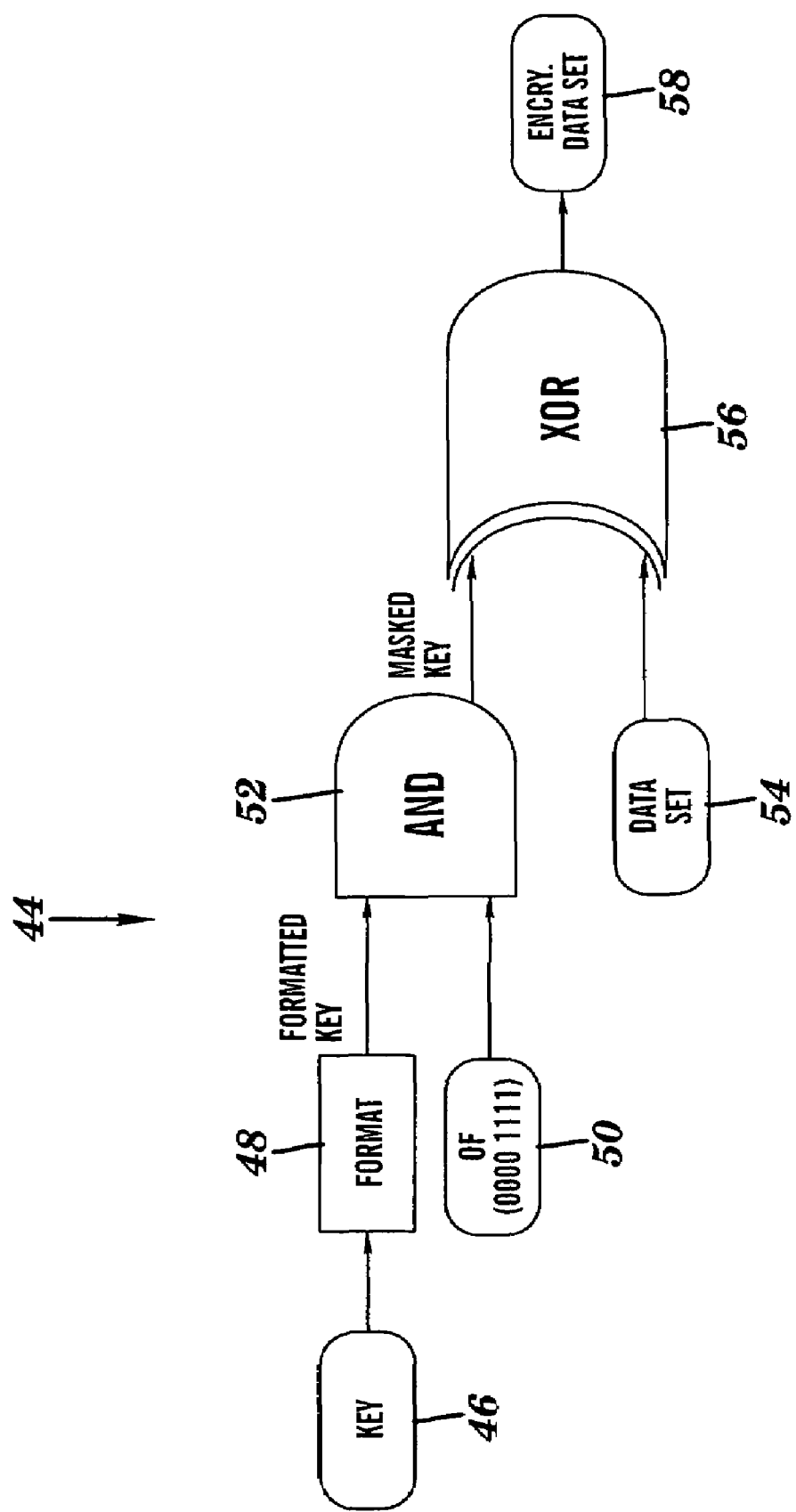
FIG. 3 depicts a flow diagram for encrypting a data set according to the present invention.

Referring now to FIG. 3, a flow diagram of the operational steps in encrypting the data set 32 is depicted. As indicated above, a key of any length is selected/inputted 46. It should be understood that the key can be selected 46 by a user seeking to encrypt data or by any means known in the art. For example, the key can be selected at random by the processing system 22. Once the key has been selected 46, it will be formatted 48 to equal the length of the data set. This may include replication and/or truncation of the key data. Once the key has been formatted, pre-determined bits (preferably the four high order bits) will be set to zero to yield a masked key. This is preferably accomplished by forming an AND result 52 of the formatted key with 0-F 50 or binary 0000 1111. An exclusive-OR result is then formed 56 between an inputted data set 54 and the masked key. The result is an encrypted data set 58.

Figure 4:
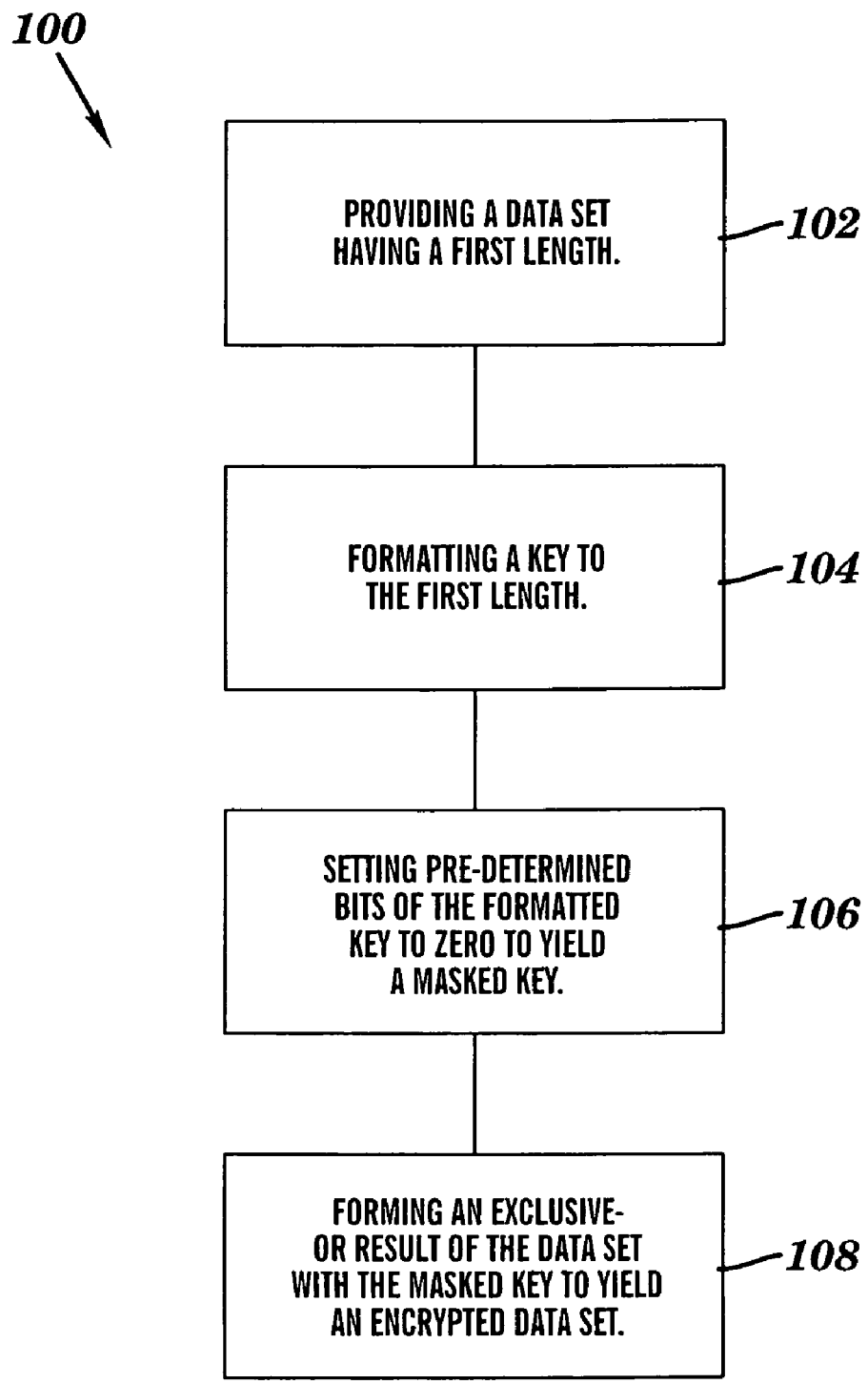
FIG. 4 depicts a flow diagram of a first method according to the present invention.

Referring now to FIG. 4, a first method 100 for processing a data set is depicted. The first step 102 of the method is to provide a data set having a first length. The second step 104 is to format a key to the first length. The third step 106 is to set pre-determined bits of the formatted key to zero to yield a masked key. The fourth step 108 of the method 100 is to form an exclusive-OR result of the data set with the masked key to yield an encrypted data set.

Figure 5:
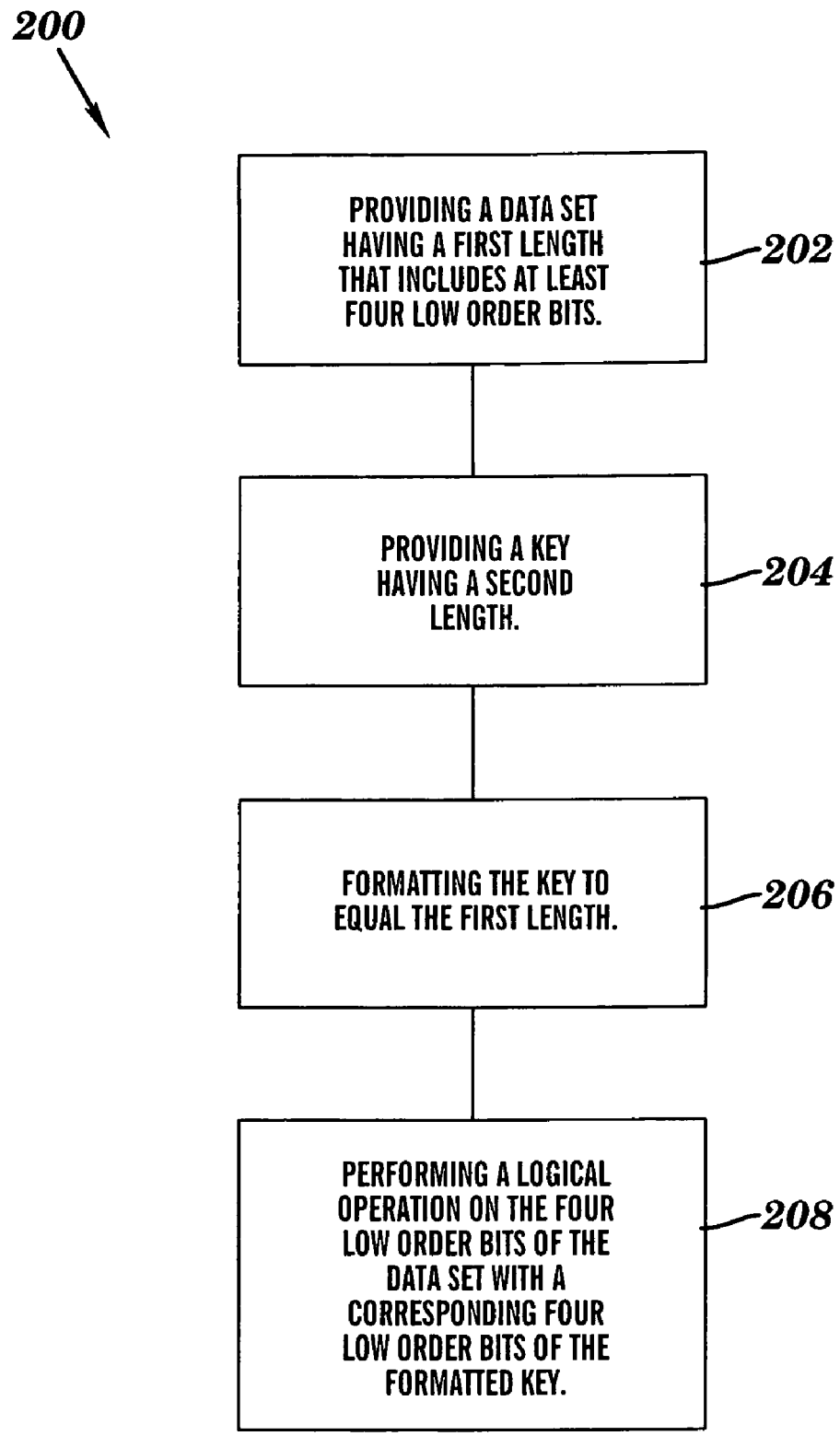
FIG. 5 depicts a flow diagram of a second method according to the present invention.

Referring now to FIG. 5, a second method 200 for processing data is shown. The first step 202 is to provide a data set having a first length that includes at least four low order bits. The second step 204 is to provide a key having a second length. The third step 206 of the method 200 is to format the key to equal the first length. The fourth step 208 is to perform a logical operation on the four low order bits of the data set with a corresponding four low order bits of the formatted key.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for processing a data set, comprising the steps of:
   providing a data set having a first length that includes at least four low order bits;
   providing a key having a second length;
   formatting the key to equal the first length;
   performing a logical operation on the four low order bits of the data set with a corresponding four low order bits of the formatted key; and
   outputting the data set,
   wherein the first length may be any length.

2. The method of claim 1, further comprising the step of replacing the four low order bits of the data set with results of the logical operation.

3. The method of claim 1, wherein the first length further includes four high order bits.

4. The method of claim 1, further comprising the step of setting the four high order bits of the key to zero, prior to the forming step.

5. The method of claim 4, wherein the setting step comprises forming an AND result of the formatted key with binary 0000 1111.

6. The method of claim 1, further comprising the step of performing an inverse logical operation on four low order bits of the encrypted data set with the four low order bits of the formatted key to yield a decrypted data set.

7. The method of claim 1, wherein the step of providing a key comprises:
   providing a second data set having a second length;
   formatting the key to the first length.

8. The method of claim 1, wherein the forming step yields an encrypted data set that is entirely within the ASCII printable range.

9. A system for processing a data set having a first length, comprising:
   a system for formatting a key to match the first length;
   a system for setting pre-determined bits of the key to zero to yield a masked key; and a system for forming an exclusive-OR result of the data set with the masked key to yield an encrypted data set,
wherein the first length may be any length.

10. The system of claim 9, wherein the system for setting predetermined bits of the key to zero includes a system for forming an AND result of the formatted key with binary 0000 1111.

11. The system of claim 9, wherein the system for formatting comprises:
a system for providing a second data set;
a system for replicating the second data set as necessary until its length is equal to or greater than the first length; and
a system truncating the second data set as necessary until its length equals the first length.

12. The system of claim 9, wherein the first length comprises four bits high order bits and four low order bits.

13. The system of claim 12 wherein the pre-determined bits set to zero are the four high order bits.

14. The system of claim 12, wherein the system for forming yields an encrypted data set wherein only the four low order bits are encrypted.

15. The system of claim 12, further comprising a system for replacing the four low order bits of the data set with the determined exclusive-OR result.

16. The system of claim 9, further comprising a system for decrypting the encrypted data set by forming an inverse exclusive-OR result of the encrypted data set with the masked key.

17. The system of claim 9, wherein the encrypted data set is entirely within the ASCII printable range.

18. A system for processing a data set, comprising:
a data set having a first length that includes at least four low order bits;
a key having a second length;
a system for formatting the key to equal the first length; and
a system for forming an exclusive-OR result of the four low order bits of the data set with a corresponding four low order bits of the formatted key to yield an encrypted data set,
wherein the first length may be any length.

19. The system of claim 18, wherein the encrypted data set is entirely within the ASCII printable range.

20. A program product stored on a computer readable storage media for processing a data set having a first length, which when executed, comprises:
a system for formatting a key to match the first length;
a system for setting pre-determined bits of the key to zero to yield a masked key; and
a system for forming an exclusive-OR result of the data set with the masked key to yield an encrypted data set,
wherein the first length may be any length.

21. The program product of claim 20, wherein the system for setting pre-determined bits of the key to zero includes a system for forming an AND result of the formatted key with binary 0000 1111.

22. The program product of claim 20, wherein the system for formatting comprises:
a system for providing a second data set;
a system for replicating the second data set as necessary until its length is equal to or greater than the first length; and
a system for truncating the second data set as necessary until its length equals the first length.

23. The program product of claim 20, wherein the first length comprises four bits high order bits and four low order bits.

24. The program product of claim 23, wherein the pre-determined bits set to zero are the four high order bits.

25. The program product of claim 23, wherein the system for forming yields an encrypted data set wherein only the four low order bits are encrypted.

26. The program product of claim 20, further comprising a system for replacing the four low order bits of the data set with the determined exclusive-OR result.

27. The program product of claim 20, further comprising a system for decrypting the encrypted data set by forming an inverse exclusive-OR result of the encrypted data set with the masked key.

28. The program product of claim 20, wherein the encrypted data set is within the ASCII printable range.

* * * * *